Aug. 3, 1954  J. T. INGRAM  2,685,474
MOTOR VEHICLE VISOR
Filed Oct. 24, 1952

J. T. INGRAM
INVENTOR.

BY E.C. McRae
J. R. Faulkner
C. H. Oster

ATTORNEYS

Patented Aug. 3, 1954

2,685,474

UNITED STATES PATENT OFFICE 2,685,474

MOTOR VEHICLE VISOR

John T. Ingram, Lincoln Park, Mich., assignor to Ford Motor Company, Dearborn, Mich., a corporation of Delaware Application October 24, 1952, Serial No. 316,635

2 Claims. (Cl. 296—97)

This invention relates generally to motor vehicle visors and more particularly to an inside sun visor having a built-in pocket for carrying purposes.

An object of the present invention is to provide an interior sun visor for a motor vehicle in which the visor is provided with a built-in pocket of substantial size for the carrying of maps, sun glasses, and other items of personal property. The visor pocket is substantially coextensive in size with the visor and is located on the rearward face thereof so as to normally be out of sight when the visor is in its up position yet which is readily accessible when the visor is swung downwardly to its operative position. A further object is to provide such a pocket which does not detract from the appearance of the visor and which presents a neat trim appearance.

Still another object of the present invention is to provide an interior sun visor having a built-in pocket in which the open side of the pocket is normally held closed by means of a concealed wire frame. The wire frame is initially formed so as to be distorted during assembly from its free position in such manner as to place portions of the frame under torsional and bending stresses so as to resiliently hold the open side of the pocket tightly closed. The edge of the pocket is thereby prevented from sagging away from the main portion of the sun visor particularly when the pocket is filled with items.

Other objects and advantages of the invention will be made more apparent as this description proceeds, particularly when considered with the accompanying drawings, wherein.

Figure 1:
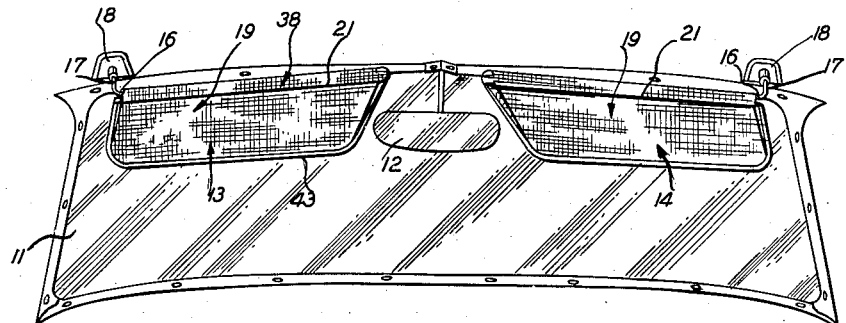
Figure 1 is an elevational view looking toward the windshield of a motor vehicle from the interior thereof, and illustrating a pair of sun visors incorporating the present invention.

Referring now to the drawings, and particularly to Figure 1, the reference character 11 indicates the windshield of a motor vehicle as viewed from the interior of the vehicle body. The windshield is of the one-piece curved type, and a rear view mirror 12 is mounted centrally of the windshield near the upper portion thereof.

A pair of sun visors 13 and 14 are shown, and these visors are conventionally rotatably mounted upon supporting rods 16 extending generally horizontally along the upper edge of the windshield. The ends 17 of the supporting rods 16 are bent upwardly and are pivotally mounted in brackets 18 secured to the vehicle roof. The visors are shown in the lowered positions adjacent the windshield but may be swung upwardly about the horizontal portions of the rods 16 to inoperative positions adjacent the roof panel, and may also be swung about the end portions 17 of the rods to positions adjacent the side windows of the vehicle.

Each visor is provided on its rearward face with a pocket 19 substantially coextensive in dimension with the visor. The lower and side edges of the pockets 19 are secured to the visor, and the upper edge 21 thereof is open to permit the insertion of various items into the pocket. It will be seen that with the visors in their down positions as shown in Figure 1, the pockets therein are readily accessible. When, however, the visors are swung upwardly about the horizontal rods 16 to their inoperative positions, the pockets are concealed from view.

Figure 2:
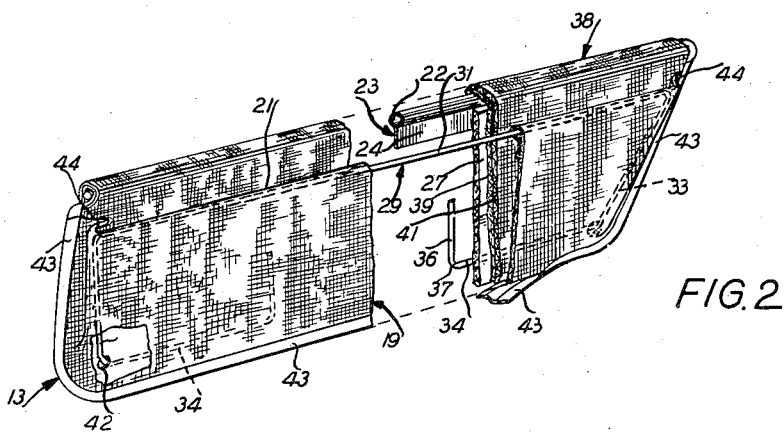
Figure 2 is an enlarged perspective view, partly broken away and in section, of one of the sun visors shown in Figure 1.
Figure 3:
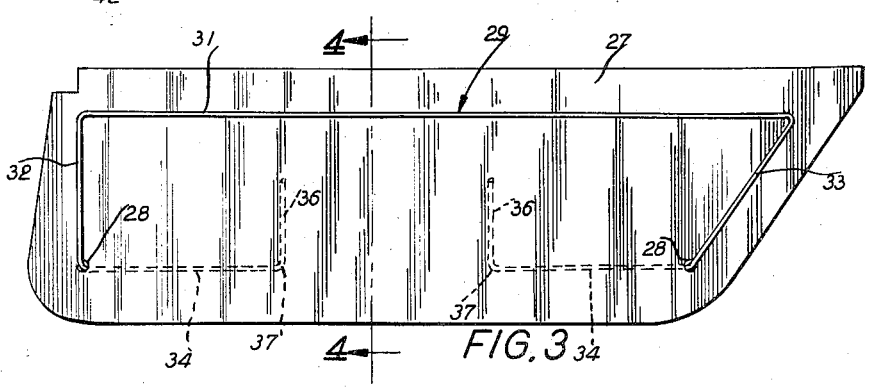
Figure 3 is an enlarged side elevational view of the visor frame and wire supporting member of the sun visor.
Figure 4:
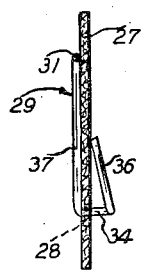
Figure 4 is a transverse cross sectional view taken on the plane indicated by the line 4—4 of Figure 3.

Reference is now made to Figures 2, 3 and 4 for a more detailed description of the construction of the visors. Inasmuch as the visors 13 and 14 are identical except for being reversed, only the left hand visor 13 will be described.

The horizontal arm of the supporting rod 16 extends into the cylindrical upper portion 22 of a metal hinge member 23. The frictional engagement between the rods 16 and the cylindrical portion 22 of the hinge member permits the visor to be swung about the axis of the rod 16 yet enables the visor to be retained in any adjusted position.

As best seen in Figure 2, the hinge member 23 is formed with a flat flange 24, the latter being secured by means of wire staples (not shown) to the upper portion of the visor frame 27. The visor frame 27 may be formed of fiber board or a pressed wood board and corresponds in size to the size of the visor.

Referring now to Figures 3 and 4, as well as to Figure 2, the visor frame 27 is formed with a pair of apertures 28 near the lower corners thereof. The apertures 28 are provided to receive the wire frame member 29, part of which is positioned on one side of the visor frame and the remainder on the opposite side thereof. The top portion 31 and the end portions 32 and 33 are positioned on the side of the visor frame facing the passenger compartment of the vehicle when the visors are in the position shown in Figure 1. The top portion 31 of the frame extends generally parallel to the visor frame and the end portions 32 and 33 are likewise generally parallel to the ends of the visor frame, being spaced inwardly therefrom a short distance. The lower extremities of the end portions 32 and 33 of the wire frame extend through the apertures 28 in the visor frame and are integrally formed with intermediate portions 34 and terminal end portions 36. The intermediate portions 34 extend generally parallel to the top portion 31 of the wire frame while the terminal end portions 36 project upwardly at right angles to the intermediate portions.

As best seen in Figure 4, the wire frame member 29 is preformed in such shape that when assembled to the visor frame 27 with the top portion 31 and the end portions 32 and 33 of the wire member line adjacent the face of the visor frame, the intermediate portions 34 and the terminal end portions 36 will be spaced from the opposite face of the visor frame throughout substantially their entire extent. The intermediate portions 34 of the wire member are straight and in their free positions are inclined with respect to the face of the visor frame, the end adjacent the aperture 28 in the frame being at the face of the visor frame while the opposite end 37 thereof at the junction between the intermediate portion 34 and the terminal end portion 36 is spaced a considerable distance away from the face of the visor frame. The terminal end portions 36 are likewise straight and are inclined in their free position, being a maximum distance from the visor frame at the corner 37 and engaging the frame at the extreme ends.

It will be apparent that if the intermediate portions 34 and end portions 36 are distorted from the free position shown in Figure 4 to a position in which they lie adjacent the face of the visor frame, torsional and bending stresses will be set up in the end portions 32 and 33 of the wire frame member tending to resiliently force the end portions 32 and 33 as well as the top portion 31 into firm but yieldable engagement with the face of the visor frame.

The hinge member 23 and the visor frame 27 are conventionally covered by a U-shaped cover 38 to form a protective and decorative cover for the visor structure. The cover 38 comprises a cardboard base 39 and a fabric 41 covering the cardboard base. The cover member 38 is provided with apertures 42 in alignment with the apertures 28 in the visor frame 27, and it will be seen that the wire frame member 29 passes through the apertures in both the visor frame 27 and the cover member 28 so that the top portion 31 and the end portions 32 and 33 of the wire frame member are located exteriorly of the cover member 38. The intermediate portions 34 and the terminal end portions 36 of the wire frame member, which are located on the opposite side of the visor frame 27, are, however, located between the visor frame 27 and the rearward wall of the U-shaped cover member 38.

A binding 43 embaces the free edges of the front and rear walls of the U-shaped cover member 38, being stitched thereto. Also embraced by the binding 43 and stitched thereto are the end and lower edges of the pocket 19. The pocket 19 is preferably formed of fabric either identical or similar in appearance to the fabric 41 of the U-shaped cover member so as to present a uniform appearance to the entire visor structure. The fabric pocket material covers the ends 32 and 33 of the wire frame member and is provided with a seam at its upper edge 21 enclosing the top portion 31 of the wire member.

It has previously been pointed out that the intermediate portions 34 and the terminal end portions 36 of the wire frame member, which are spaced from the rearward face of the visor frame 27 in their free positions, are located between the visor frame and rear wall of the U-shaped cover member 38. The cardboard backing 39 of the cover member is sufficiently rigid after being assembled and having its free edges secured together by the binding 43 to distort the portions 34 and 36 of the wire frame member from their free position spaced from the visor frame to a position lying closely adjacent the visor frame. This distortion applies a bending and torsional stress to the end portions 32 and 33 of the wire member on the forward face of the visor frame and results in clamping the top portion 31, and particularly the ends thereof, of the wire member tightly against the body of the visor. Since the top portion 31 of the wire member is contained within the turned over upper edge of the pocket 19, it will be seen that when assembled the upper edge 21 of the pocket is yieldably held tightly against the body of the visor. It can, however, readily be opened to permit the insertion of articles into the pocket, and yet at all times maintains a trim non-sagging appearance. The fabric of the pocket 19 is formed with flaps 44 adjacent the ends theerof to permit the pocket to be opened and to have a greater carrying capacity.

It will be understood that the invention is not to be limited to the exact construction shown and described, but that various changes and modifications may be made without departing from the spirit and scope of the invention, as defined in the appended claims.

What is claimed is:

1. A sun visor for a motor vehicle adapted to be positioned adjacent the interior side of a vehicle windshield, comprising a metal hinge member at the top edge of the visor, a semi-rigid frame for the visor secured to said hinge member and depending therefrom, a U-shaped cover member surrounding said visor frame and hinge member, a binding securing the ends and lower edge of said U-shaped cover member together, a pocket flap positioned exteriorly of said U-shaped cover member on one side thereof and having its ends and lower edge secured to said binding, and a resilient wire frame member for said pocket flap, said wire frame member having a straight upper portion secured to the free upper edge of said pocket flap and end portions extending through apertures in the cover member and the visor frame and terminating in deformable end portions located between the visor frame and the cover member on the opposite side of said visor frame from said pocket flap, said cover member being sufficiently rigid to deform the deformable end portions of said wire frame member to urge the straight upper portion of the wire frame member at the top edge of the pocket into resilient engagement with the adjacent portion of the cover member.

2. A sun visor for a motor vehicle adapted to be positioned adjacent the interior side of a vehicle windshield, comprising a hinge member at the top edge of the visor, a semi-rigid visor frame secured to said hinge member, a cover member surrounding said visor frame and hinge member, a wire supporting member having a generally inverted U-shaped pocket supporting portion on one side of the visor frame with the lower ends of the U-shaped portion extending through apertures in the visor frame and an integral deformable portion on the opposite side of the visor frame between the visor frame and the cover member with separate bent end portions extending from the lower ends of the inverted U-shaped portion and with the bent end portions in their free positions being inclined with respect to the visor frame but in their assembled positions between the visor frame and the cover member being positioned generally adjacent the visor frame and placing portions of the inverted U-shaped pocket supporting portion of the wire supporting member under torsional and bending stresses to resiliently clamp the latter adjacent the opposite face of the visor frame and a flap covering the pocket supporting portion of said wire supporting member.

References Cited in the file of this patent

UNITED STATES PATENTS

| Number | Name | Date |
|---|---|---|
| 1,523,323 | Wensinger | Jan. 13, 1925 |
| 1,815,028 | Burch | July 14, 1931 |
| 1,898,276 | Van Dresser | Feb. 21, 1933 |
| 2,522,477 | Wexberg et al. | Sept. 12, 1950 |
| 2,589,866 | Roberts | Mar. 18, 1952 |
| 2,598,029 | Baldwin | May 21, 1952 |